US010168518B2

(12) United States Patent
Amano et al.

(10) Patent No.: US 10,168,518 B2
(45) Date of Patent: Jan. 1, 2019

(54) LASER SCANNING MICROSCOPE (71) Applicant: OLYMPUS CORPORATION, Hachioji-shi, Tokyo (JP)

(72) Inventors: Yusuke Amano, Tokyo (JP); Susumu Honda, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/436,742

(22) Filed: Feb. 17, 2017

(65) Prior Publication Data
US 2017/0285315 A1    Oct. 5, 2017

(30) Foreign Application Priority Data

Mar. 29, 2016 (JP) .................................. 2016-066109

(51) Int. Cl.
G02B 21/00 (2006.01)
G02B 27/00 (2006.01)
G02B 21/08 (2006.01)
G02B 21/26 (2006.01)

(52) U.S. Cl.
CPC .......... G02B 21/002 (2013.01); G02B 21/08 (2013.01); G02B 21/26 (2013.01); G02B 27/0018 (2013.01)

(58) Field of Classification Search
CPC .. G02B 21/00; G02B 21/002; G02B 21/0032; G02B 21/0088; G02B 21/02; G02B 21/08; G02B 5/003; G02B 27/0018
See application file for complete search history.

(56) References Cited

U.S. PATENT DOCUMENTS

| 5,535,052 A | 7/1996 | Joergens | |
|---|---|---|---|
| 2004/0178334 A1* | 9/2004 | Sasaki | G02B 21/002 250/234 |
| 2011/0321204 A1* | 12/2011 | Karaki | B82Y 20/00 850/32 |
| 2014/0002905 A1* | 1/2014 | Kawata | G02B 5/003 359/611 |
| 2017/0090173 A1* | 3/2017 | Kitahara | G02B 5/005 |

FOREIGN PATENT DOCUMENTS

| DE | 10 2010 053 475 A1 * | 6/2012 |
| JP | 06167654 A | 6/1994 |
| JP | 2009-98230 * | 5/2009 |

OTHER PUBLICATIONS

English translation of the specification of the Japanese reference No. 2009-98230.*

* cited by examiner

Primary Examiner — Thong Nguyen
(74) Attorney, Agent, or Firm — Holtz, Holtz & Volek PC (57) ABSTRACT Provided is a laser scanning microscope including a stage on which a sample is placed, an objective lens that is disposed below the stage and that focuses laser light from a light source onto the sample, a scanner that scans the laser light focused by the objective lens over the sample, a condenser lens disposed opposite the objective lens with the stage interposed therebetween, and a light blocking cover that is disposed in an optical path between the condenser lens and the stage and that blocks external light entering the objective lens or the condenser lens from above the sample via the stage.

7 Claims, 12 Drawing Sheets

LASER SCANNING MICROSCOPE

This application claims the benefit of Japanese Patent Application No. 2016-066109, the content of which is incorporated herein by reference.

TECHNICAL FIELD

The present invention relates to laser scanning microscopes.

BACKGROUND ART

In the related art, laser scanning microscopes used for performing transmission observation and vertical-illumination observation are known (for example, see Patent Literature 1). In order to prevent light other than fluorescence from a sample, such as light from a fluorescent lamp, from entering a photodetector from above the sample in a laser scanning microscope used for performing transmission observation and vertical-illumination observation, the laser scanning microscope is set inside a darkroom or the entire laser scanning microscope is covered with a dark box so as to be used in a dark observation environment.

CITATION LIST

Patent Literature

{PTL 1}
Japanese Unexamined Patent Application, Publication No. Hei 06-167654

SUMMARY OF INVENTION

An aspect of the present invention provides a laser scanning microscope including a stage on which a sample is placed, an objective lens that is disposed below the stage and that focuses laser light from a light source onto the sample, a scanner that scans the laser light focused by the objective lens over the sample, a condenser lens disposed opposite the objective lens with the stage interposed therebetween, and a light blocking cover that is disposed in an optical path between the condenser lens and the stage and that blocks external light entering the objective lens or the condenser lens from above the sample via the stage.

DESCRIPTION OF EMBODIMENTS

A laser scanning microscope according to an embodiment of the present invention will be described below with reference to the drawings.

Figure 1:
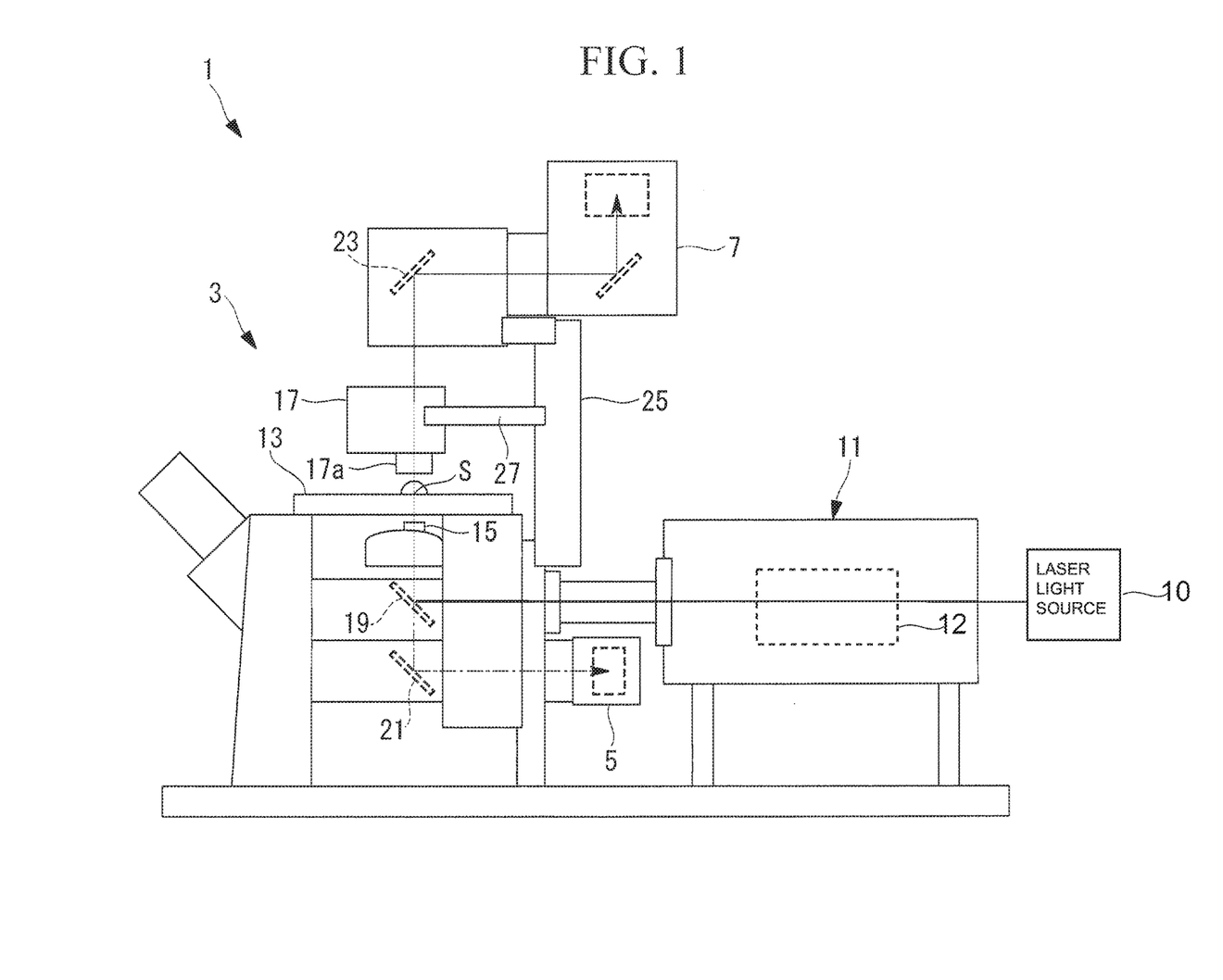
FIG. 1 schematically illustrates the configuration of a laser scanning microscope according to an embodiment of the present invention.

As shown in FIG. 1, a laser scanning microscope 1 according to this embodiment is an inverted-type microscope and includes a microscope body 3, an external vertical-illumination detector 5, such as a photomultiplier tube for vertical-illumination observation, connected to the microscope body 3, and a transmission detector 7, such as a photomultiplier tube for transmission observation, connected to the microscope body 3.

The microscope body 3 includes: an observation unit 11 having, for example, an internal detector (not shown); a stage 13 on which a sample S is placed; an objective lens 15 and a condenser lens 17 disposed facing each other in the vertical direction with the stage 13 interposed therebetween; a dichroic mirror 19 that reflects laser light emitted from a laser light source 10 toward the objective lens 15; a reflection mirror 21 that reflects observation light, such as fluorescence generated at the objective lens 15 side of the sample S on the stage 13 as a result of it being irradiated with the laser light, toward the external vertical-illumination detector 5; and a reflection mirror 23 that reflects observation light, such as transmitted light (laser light) or fluorescence generated at the condenser lens 17 side of the sample S on the stage 13 as a result of it being irradiated with the laser light, toward the transmission detector 7.

The transmission detector 7, the condenser lens 17, and the reflection mirror 23 are supported by a transmissive column 25 extending in the vertical direction of the microscope body 3 and are disposed higher than the stage 13.

The observation unit 11 includes a scanner 12, such as a galvanometer mirror that two-dimensionally scans the laser light emitted from the laser light source, a pinhole that limits transmission of fluorescence returning from the sample S irradiated with the laser light along the optical path of the laser light via the scanner, and an internal detector, such as a photomultiplier tube that detects the fluorescence transmitted through the pinhole.

Examples of the laser light source used include a continuous laser light source that generates visible laser light for one-photon excitation observation, such as a semiconductor laser, and a pulsed laser light source that emits pulsed near-infrared laser light for two-photon excitation observation. For example, the continuous laser light source or the pulsed laser light source introduces the laser light to the observation unit 11 directly or via a fiber.

The pinhole is disposed at a conjugate position with respect to the pupil position of the objective lens 15 and allows only fluorescence generated at the focal position of the objective lens 15 in the sample S to be transmitted.

The objective lens 15 is disposed facing vertically upward below the stage 13. The objective lens 15 radiates the laser light input from the laser light source via, for example, the scanner of the observation unit 11 and the dichroic mirror 19 onto the sample S on the stage 13 from below and collects fluorescence (observation light) generated in the sample S and returning along the optical path of the laser light.

The condenser lens 17 is disposed facing vertically downward above the stage 13 and is supported in a movable manner along the transmissive column 25 by a vertical moving mechanism 27 provided at the transmissive column 25. The condenser lens 17 focuses transmitted light or fluorescence (observation light) generated at the transmission side of the sample S irradiated with the laser light from below the sample S on the stage 13 by the objective lens 15. Moreover, the condenser lens 17 has a tubular protrusion 17a protruding vertically downward along the optical axis.

The dichroic mirror 19 reflects the laser light emitted from the laser light source and scanned by the scanner of the observation unit 11 toward the objective lens 15, and splits off the fluorescence from the sample S collected by the objective lens 15 and returning along the optical path of the laser light into an optical path that enters the internal detector via the scanner of the observation unit 11 and an optical path that enters the external vertical-illumination detector 5 via the reflection mirror 21. Furthermore, the dichroic mirror 19 and a total reflection mirror (not shown) are supported by a turret (not shown).

The turret is capable of selectively disposing the dichroic mirror 19 and the total reflection mirror in the optical path of the laser light.

By using the turret to dispose the total reflection mirror in place of the dichroic mirror 19 in the optical path of the laser light, the laser light emitted from the laser light source and scanned by the scanner of the observation unit 11 is reflected toward the objective lens 15, and the fluorescence from the sample S collected by the objective lens 15 and returning along the optical path of the laser light is reflected toward the observation unit 11.

Figure 2:
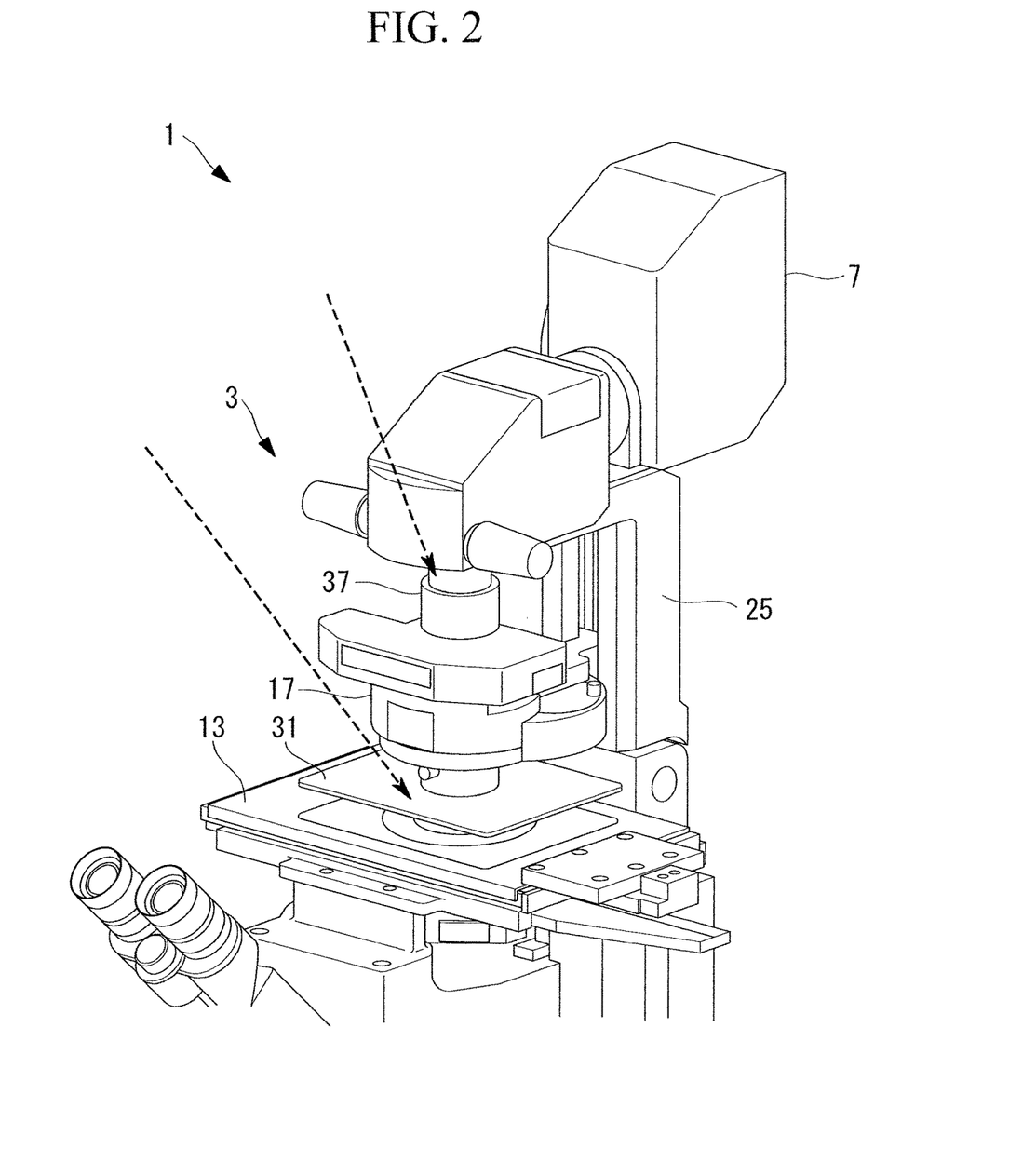
FIG. 2 is an enlarged view of a microscope body in the laser scanning microscope in FIG. 1.

Furthermore, as shown in FIG. 2, the laser scanning microscope 1 includes a light blocking cover 31 that has light blocking properties and that is capable of blocking external light entering the objective lens 15 or the condenser lens 17 via the stage 13 from above the sample S, and also includes a light-blocking tubular member 37 that has light blocking properties and that is capable of blocking external light reflected by the condenser lens 17 and entering the transmission detector 7 from above the sample S.

Figure 3:
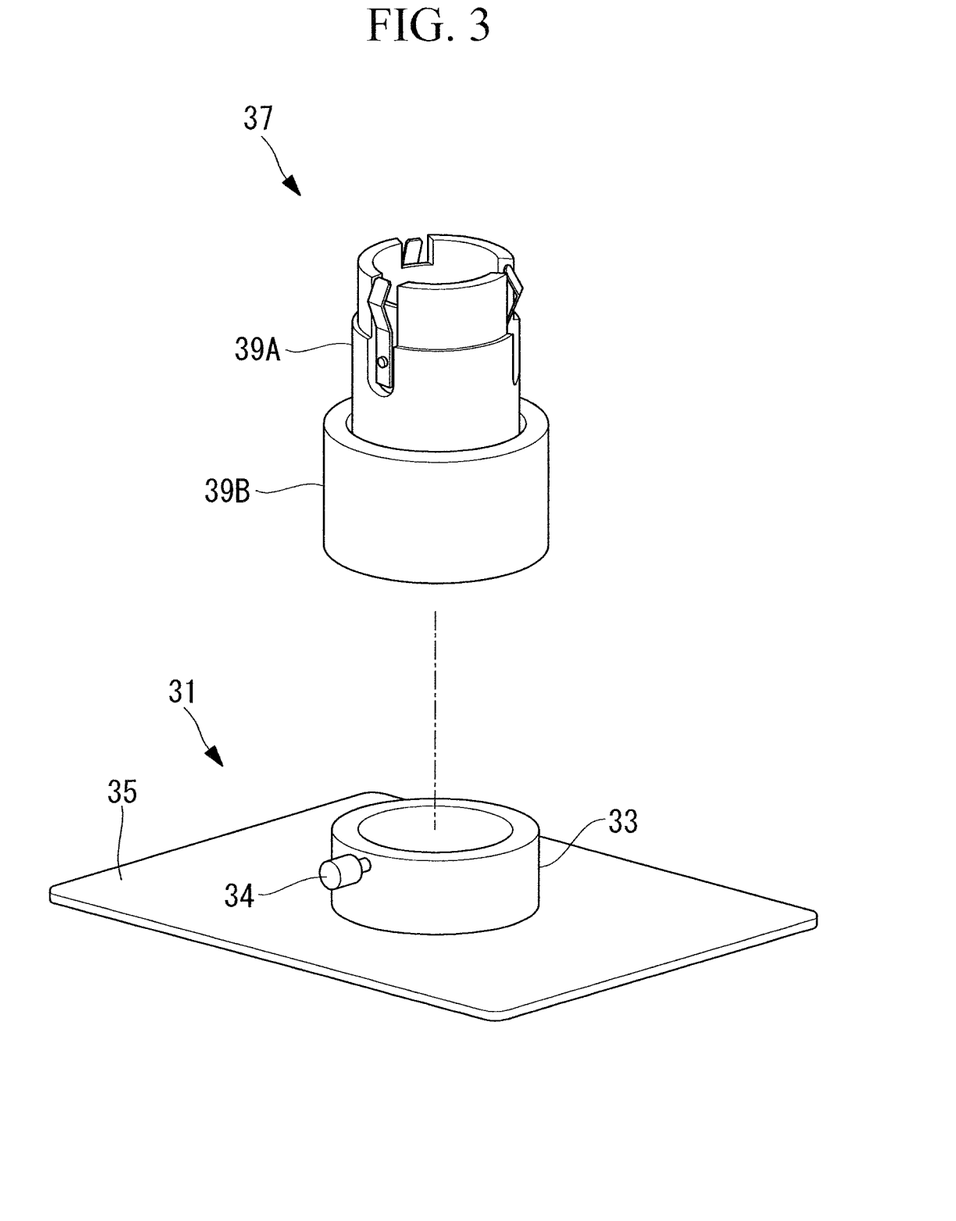
FIG. 3 is a perspective view illustrating a light blocking cover and a light-blocking tubular member in FIG. 2.

The light blocking cover 31 is disposed in the optical path between the condenser lens 17 and the stage 13. As shown in FIG. 3, the light blocking cover 31 has a tubular attachment section 33 attachable to and detachable from the condenser lens 17 and also has a flange section 35 extending radially from the attachment section 33.

Figure 4A:
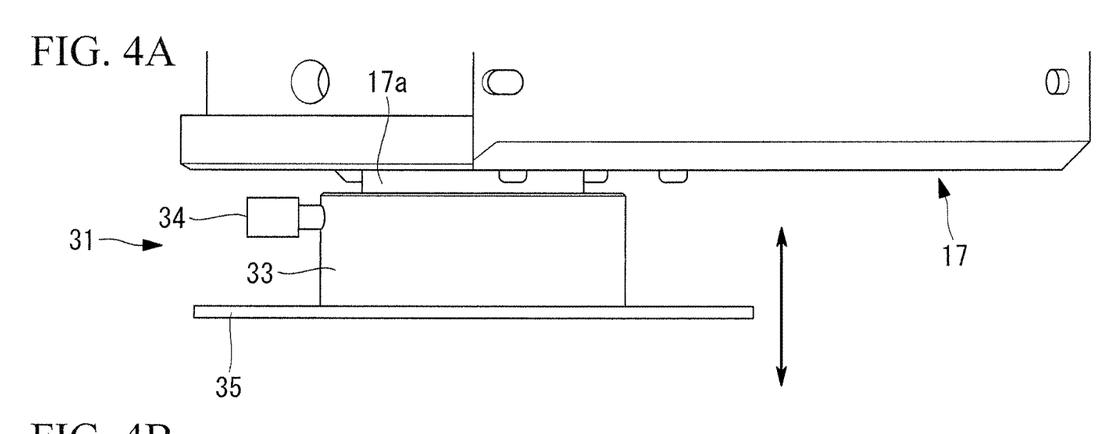
FIG. 4A is a side view illustrating a state where the light blocking cover is secured at a position where it is close to a condenser lens.
Figure 4B:
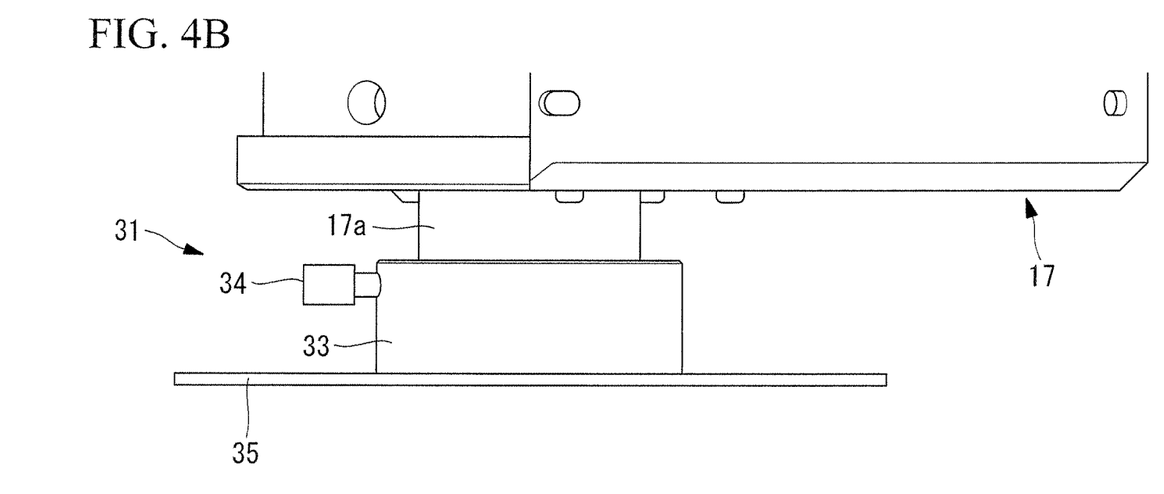
FIG. 4B is a side view illustrating a state where the light blocking cover is secured at a position where it is farther away from the condenser lens than in FIG. 4A.

As shown in FIGS. 4A and 4B, the attachment section 33 is secured to the protrusion 17a by using a securing screw 34 in a state where the protrusion 17a of the condenser lens 17 is engaged therewith. Accordingly, it is not necessary to secure the light blocking cover 31 to the stage 13, thereby achieving improved ease of operation when performing, for example, a replacement process of the sample S. In a case where the condenser lens 17 is moved away from the stage 13 along the transmissive column 25 by using the vertical moving mechanism 27, the light blocking cover 31 also moves together with the condenser lens 17, thereby ensuring space above the stage 13 and facilitating the replacement process of the sample S.

Furthermore, the attachment section 33 is configured such that the position where it is secured by the securing screw 34 can be shifted in the longitudinal direction of the protrusion 17a. Thus, as shown in FIGS. 4A and 4B, the attachment position of the light blocking cover 31 in the condenser lens 17 can be changed in the optical-axis direction of the condenser lens 17, thereby dealing with various heights of the sample S. FIG. 4A illustrates a state where the light blocking cover 31 is secured at a position where it is close to the condenser lens 17, that is, a state where the light blocking cover 31 is secured at a position where it is away from the stage 13. FIG. 4B illustrates a state where the light blocking cover 31 is secured at a position where it is away from the condenser lens 17, that is, a state where the light blocking cover 31 is secured at a position where it is close to the stage 13.

For example, as shown in FIG. 3, the flange section 35 extends in a substantially rectangular shape around the attachment section 33.

Figure 5:
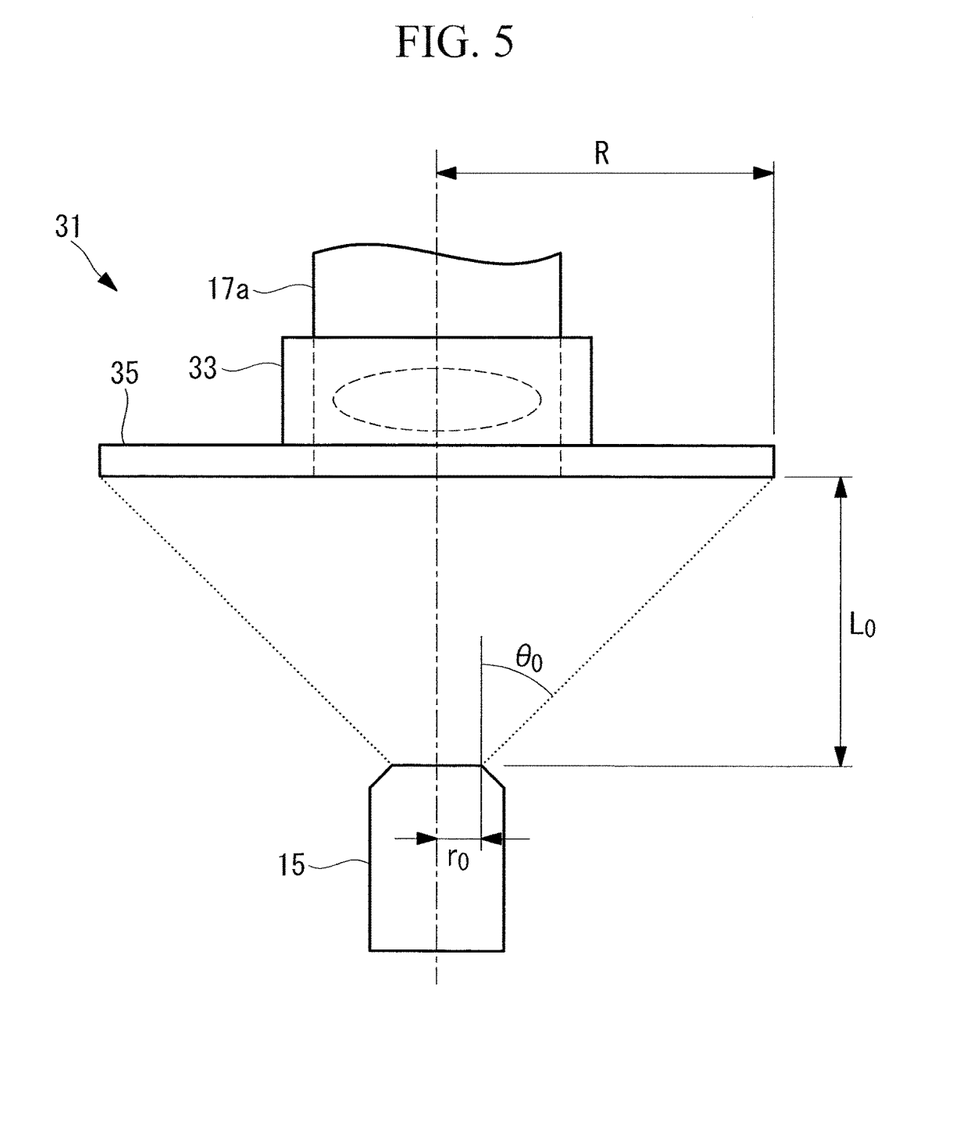
FIG. 5 is a side view explaining a conditional expression for the width of a flange section of the light blocking cover when performing vertical-illumination observation.

When performing vertical-illumination observation, it is preferable that the width of the flange section 35 satisfy conditional expression (1) below, as shown in FIG. 5.

$$R \geq r_o + L_o \tan \theta_o \quad (1)$$

In this case, R denotes the half of width of the flange section 35 of the light blocking cover 31, $r_o$ denotes the aperture radius of the objective lens 15, $L_o$ denotes the distance between the objective lens 15 and the light blocking cover 31 in the optical-axis direction, and $\theta_o$ denotes the aperture angle of the objective lens 15.

With the width of the flange section 35 of the light blocking cover 31 satisfying conditional expression (1), the light blocking cover 31 can more reliably prevent external light passing through the stage 13 from above the sample S from entering the objective lens 15 during vertical-illumination observation.

Figure 6:
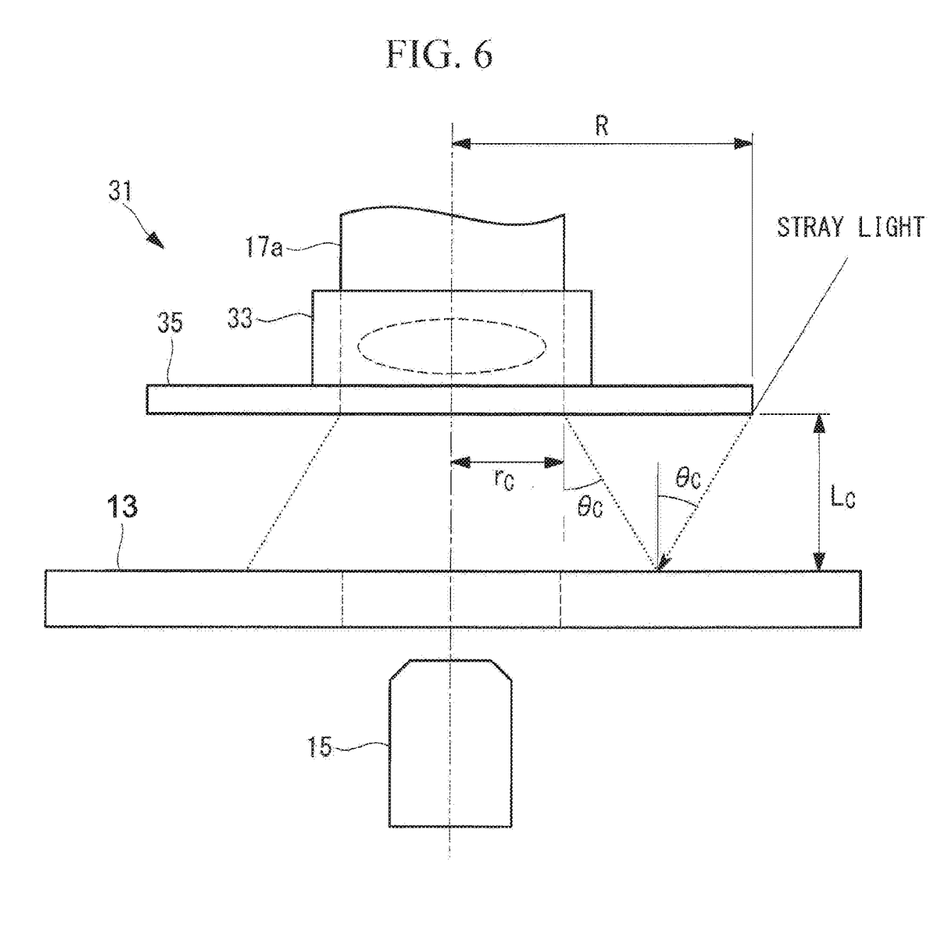
FIG. 6 is a side view explaining a conditional expression for the width of the flange section of the light blocking cover when performing transmission observation.

When performing transmission observation, it is preferable that the width of the flange section 35 satisfy conditional expression (2) below, as shown in FIG. 6.

$$R \geq r_c + 2L_c \tan \theta_c \quad (2)$$

In this case, $r_c$ denotes the aperture radius of the condenser lens 17, $L_c$ denotes the distance between the stage 13 and the light blocking cover 31 in the optical-axis direction, and $\theta_c$ denotes the aperture angle of the condenser lens 17.

With the width of the flange section 35 of the light blocking cover 31 satisfying conditional expression (2), the light blocking cover 31 can more reliably prevent external light reflected by the stage 13 from above the sample S from entering the condenser lens 17 during transmission observation.

In a case where the light blocking cover 31 is applied to both vertical-illumination observation and transmission observation, it is preferable that the width of the flange section 35 satisfy the larger of the widths R in conditional expressions (1) and (2).

Figure 7:
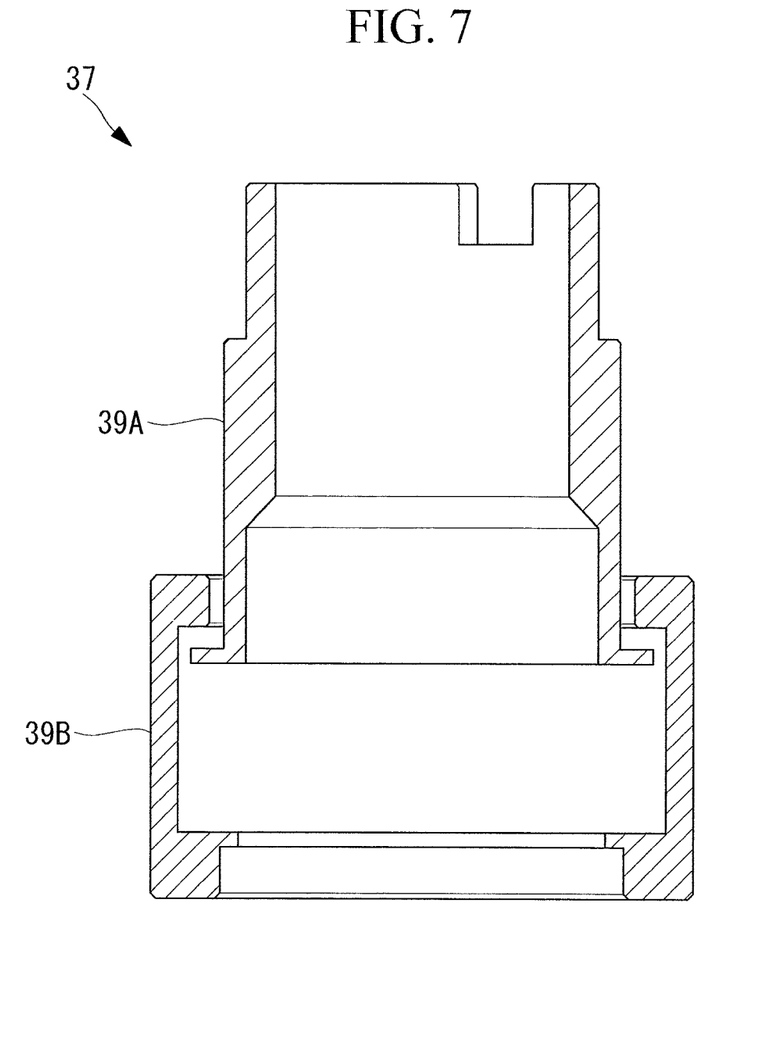
FIG. 7 is a vertical sectional view of the light-blocking tubular member in FIG. 3.

As shown in FIG. 2, the light-blocking tubular member 37 is disposed opposite the stage 13 with the condenser lens 17 interposed therebetween. Specifically, the light-blocking tubular member 37 is attached to the transmissive column 25 and is disposed between the condenser lens 17 and the reflection mirror 23. As shown in FIG. 7, the light-blocking tubular member 37 has a nested structure constituted of a small-diameter tubular member 39A and a large-diameter tubular member 39B and is expandable and contractible in the optical-axis direction (i.e., the central-axis direction of the tubular member 39A and the tubular member 39B).

The operation of the laser scanning microscope 1 having the above-described configuration will now be described.

In a case where the laser scanning microscope 1 according to this embodiment is used to perform vertical-illumination observation of the sample S on the stage 13 by using the continuous laser light source and the internal detector, the total reflection mirror is disposed in the optical path of laser light in place of the dichroic mirror 19 by using the turret, and visible laser light is generated from the continuous laser light source.

The visible laser light emitted from the continuous laser light source is scanned by the scanner of the observation unit 11, is subsequently reflected by the total reflection mirror, and is radiated onto the sample S by the objective lens 15. Of fluorescence generated in the sample S as a result of it being irradiated with the visible laser light, fluorescence (observation light) collected by the objective lens 15 is reflected by the total reflection mirror, returns along the optical path of the visible laser light, passes through the pinhole via the scanner, and is detected by the internal detector.

Next, in a case where vertical-illumination observation of the sample S on the stage 13 is to be performed by using the pulsed laser light source and the external vertical-illumination detector 5, the dichroic mirror 19 is disposed in the optical path of laser light in place of the total reflection mirror by using the turret, and pulsed near-infrared laser light is generated from the pulsed laser light source.

The near-infrared laser light emitted from the pulsed laser light source is scanned by the scanner of the observation unit 11, is subsequently reflected by the dichroic mirror 19, and is radiated onto the sample S by the objective lens 15. Of fluorescence generated in the sample S as a result of it being irradiated with the near infrared laser light, fluorescence (observation light) collected by the objective lens 15 is transmitted through the dichroic mirror 19, is reflected by the reflection mirror 21, and is subsequently detected by the external vertical-illumination detector 5.

Figure 8:
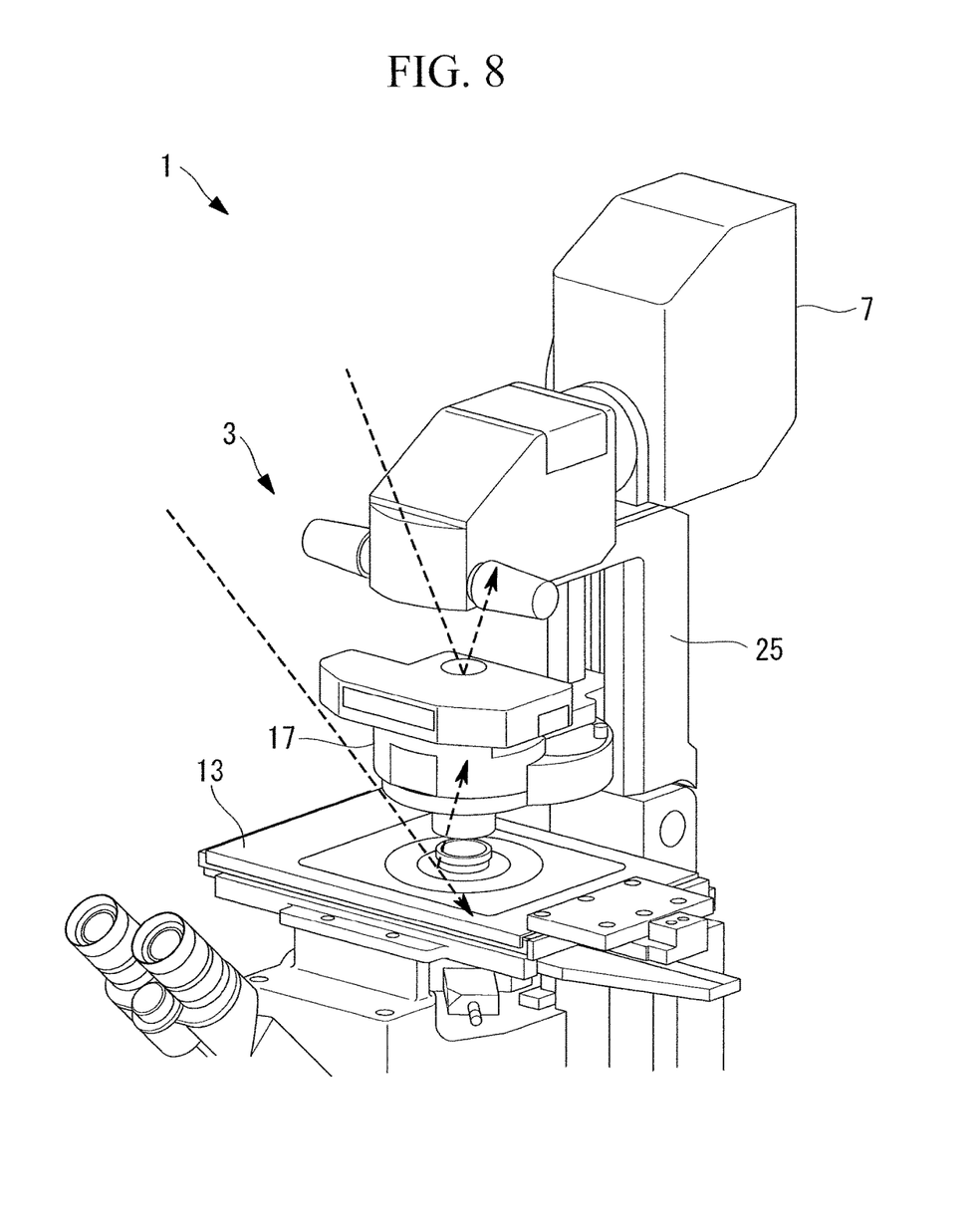
FIG. 8 is an enlarged view of the microscope body when the light blocking cover and the light-blocking tubular member are removed from the laser scanning microscope in FIG. 2.

In these cases of vertical-illumination observation, for example, as shown in FIG. 8, when the light blocking cover 31 is removed from the microscope body 3, external light from above the sample S, such as light from a fluorescent lamp, may pass through the stage 13 and enter the objective lens 15.

In contrast, as shown in FIG. 2, by attaching the light blocking cover 31 to the microscope body 3, the external light passing through the stage 13 from above the sample S and entering the objective lens 15 can be blocked by the light blocking cover 31. Therefore, during vertical-illumination observation, external light can be prevented from entering the optical path of the observation light and from being detected by the internal detector or the external vertical-illumination detector 5.

Next, in a case where transmission observation of the sample S on the stage 13 is to be performed by using the continuous laser light source or the pulsed laser light source and the transmission detector 7, the total reflection mirror or the dichroic mirror 19 is disposed in the optical path of laser light by using the turret, and visible laser light is generated from the continuous laser light source or pulsed near-infrared laser light is generated from the pulsed laser light source.

The visible laser light emitted from the continuous laser light source or the near-infrared laser light emitted from the pulsed laser light source is scanned by the scanner of the observation unit 11, is subsequently reflected by the total reflection mirror or the dichroic mirror 19, and is radiated onto the sample S by the objective lens 15. Transmitted light (observation light) transmitted through the sample S as a result of it being irradiated with the visible laser light or fluorescence (observation light) generated at the transmission side of the sample S as a result of it being irradiated with the near-infrared laser light is collected by the condenser lens 17, is reflected by the reflection mirror 23, and is subsequently detected by the transmission detector 7.

In such a case of transmission observation, as shown in FIG. 8, when the light blocking cover 31 and the light-blocking tubular member 37 are removed from the microscope body 3, external light from above the sample S, such as light from a fluorescent lamp, may be reflected by the stage 13 and the condenser lens 17 and enter the optical path of the observation light, such as the transmitted light or the fluorescence.

In contrast, as shown in FIG. 2, by attaching the light blocking cover 31 to the microscope body 3, the external light reflected by the stage 13 from above the sample S and entering the optical path of the observation light via the condenser lens 17 is blocked by the light blocking cover 31. Furthermore, by providing the light-blocking tubular member 37, the external light reflected by the condenser lens 17 from above the sample S and entering the optical path of the observation light is blocked by the light-blocking tubular member 37. Therefore, during transmission observation, external light can be prevented from entering the optical path of the observation light and from being detected by the transmission detector 7.

As described above, in the laser scanning microscope 1 according to this embodiment, the light blocking cover 31 and the light-blocking tubular member 37 can block external light entering the optical path of the observation light in the microscope body 3 from above the sample S. Therefore, the laser scanning microscope 1 does not have to be used in a darkroom or be covered with a dark box, thereby achieving improved ease of operation during observation and preventing external light from entering from above the sample S.

Furthermore, as shown in FIGS. 4A and 4B, by adjusting the attachment position of the light blocking cover 31 in the optical-axis direction of the condenser lens 17 in accordance with the position of the condenser lens 17 in the optical-axis direction, the distance from the stage 13 to the light blocking cover 31 in the optical-axis direction can be properly maintained, thereby maintaining the blocking efficiency of the light blocking cover 31 against external light from above the sample S.

Furthermore, by adjusting the length of the light-blocking tubular member 37 in the optical-axis direction in accordance with the position of the condenser lens 17 in the optical-axis direction, the gap between the condenser lens 17 and the transmissive column 25 can be reduced, thereby maintaining the blocking efficiency of the light-blocking tubular member 37 against external light from above the sample S. Although the light-blocking tubular member 37 is attached to the transmissive column 25 in this embodiment, the light-blocking tubular member 37 may alternatively be attached to the condenser lens 17.

Figure 9:
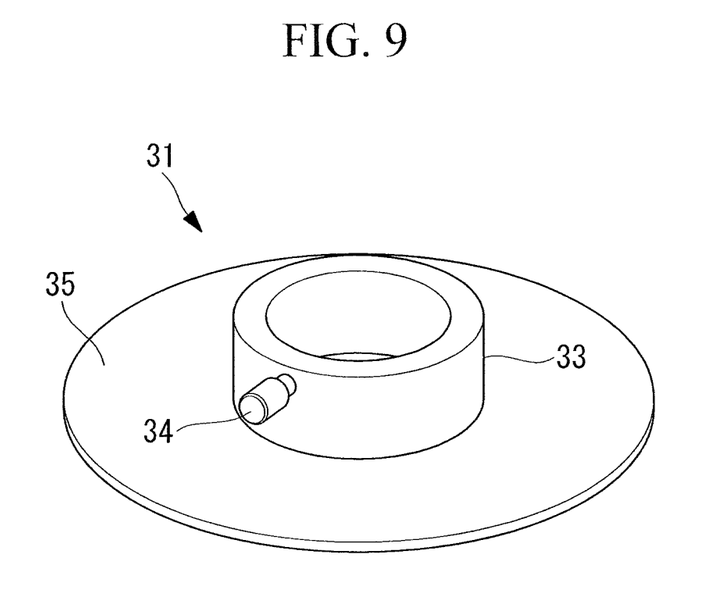
FIG. 9 is a perspective view illustrating another example of the light blocking cover.

Furthermore, as an alternative to this embodiment in which the light blocking cover 31 has the rectangular flange section 35, for example, the light blocking cover 31 may have a disk-shaped flange section 35, as shown in FIG. 9, so long as the width of the flange section 35 satisfies conditional expressions (1) and (2) indicated above.

Furthermore, although the light-blocking tubular member 37 has the nested structure constituted of the tubular members 39A and 39B in this embodiment, for example, the light-blocking tubular member 37 may have a bellows structure so long as the light-blocking tubular member 37 is expandable and contractible in the optical-axis direction.

This embodiment can be modified as follows.

For example, the flange section 35 of the light blocking cover 31 may be divided into a plurality of pieces in the circumferential direction of the attachment section 33, and at least one of the pieces may be movable in the circumferential direction of the attachment section 33. For example, in an example shown in FIGS. 10A, 10B, and 11, the flange section 35 is divided into a substantially semicircular non-movable piece 35A integrated with the attachment section 33 and a substantially semicircular movable piece 35B that is rotatable in the circumferential direction relative to the attachment section 33.

Figure 10A:
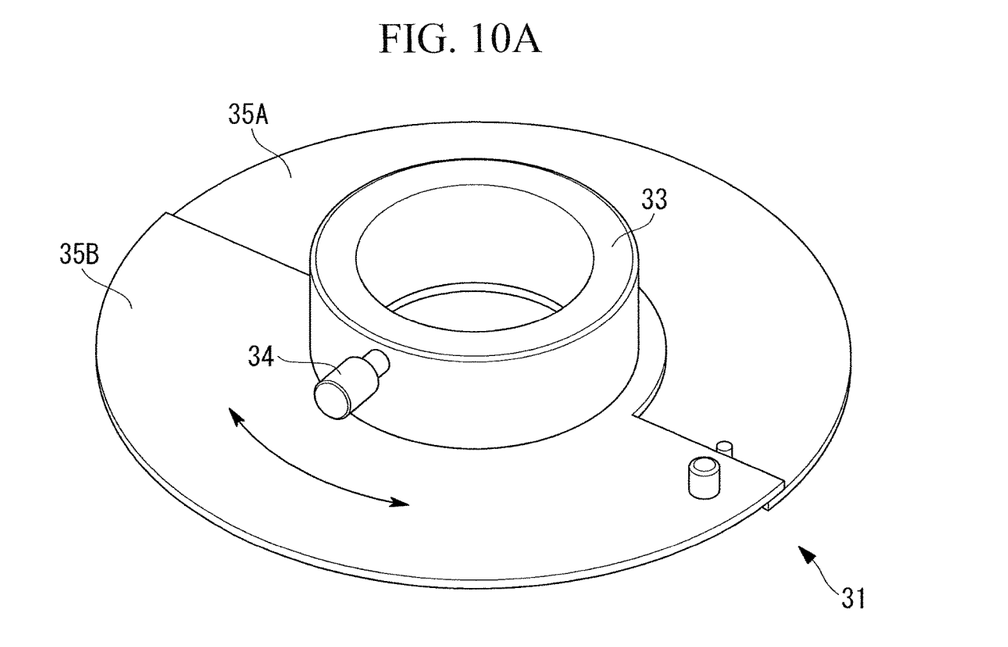
FIG. 10A is a perspective view illustrating a state where a non-movable piece and a movable piece of a light blocking cover according to a modification of the embodiment of the present invention are disposed around the entire circumferential direction.
Figure 10B:
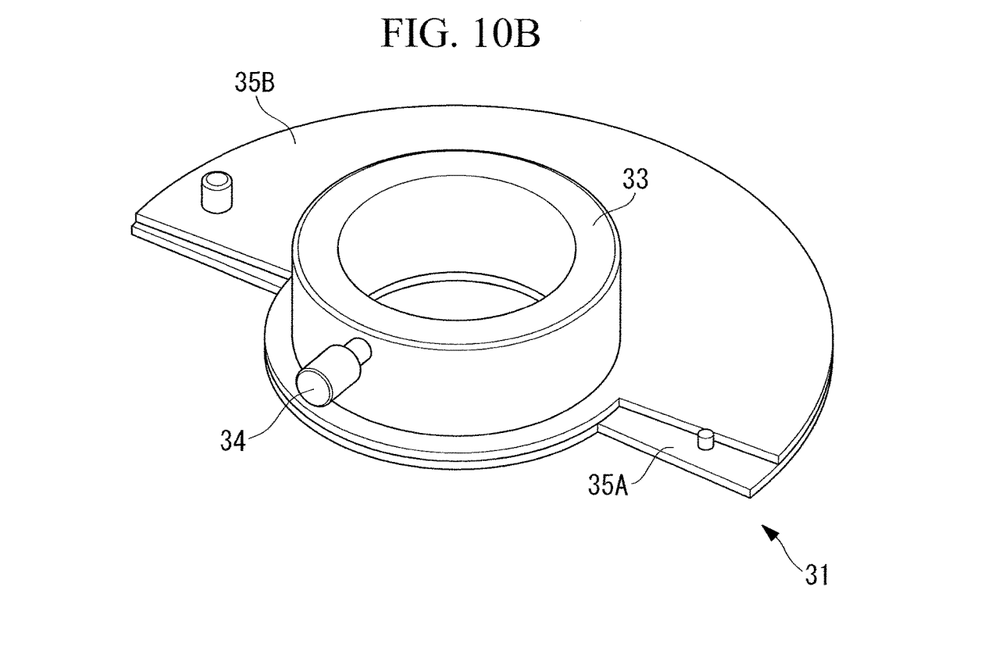
FIG. 10B is a perspective view illustrating a state where the non-movable piece and the movable piece of the light blocking cover according to the modification of the embodiment of the present invention are overlapped in the axial direction.
Figure 11:
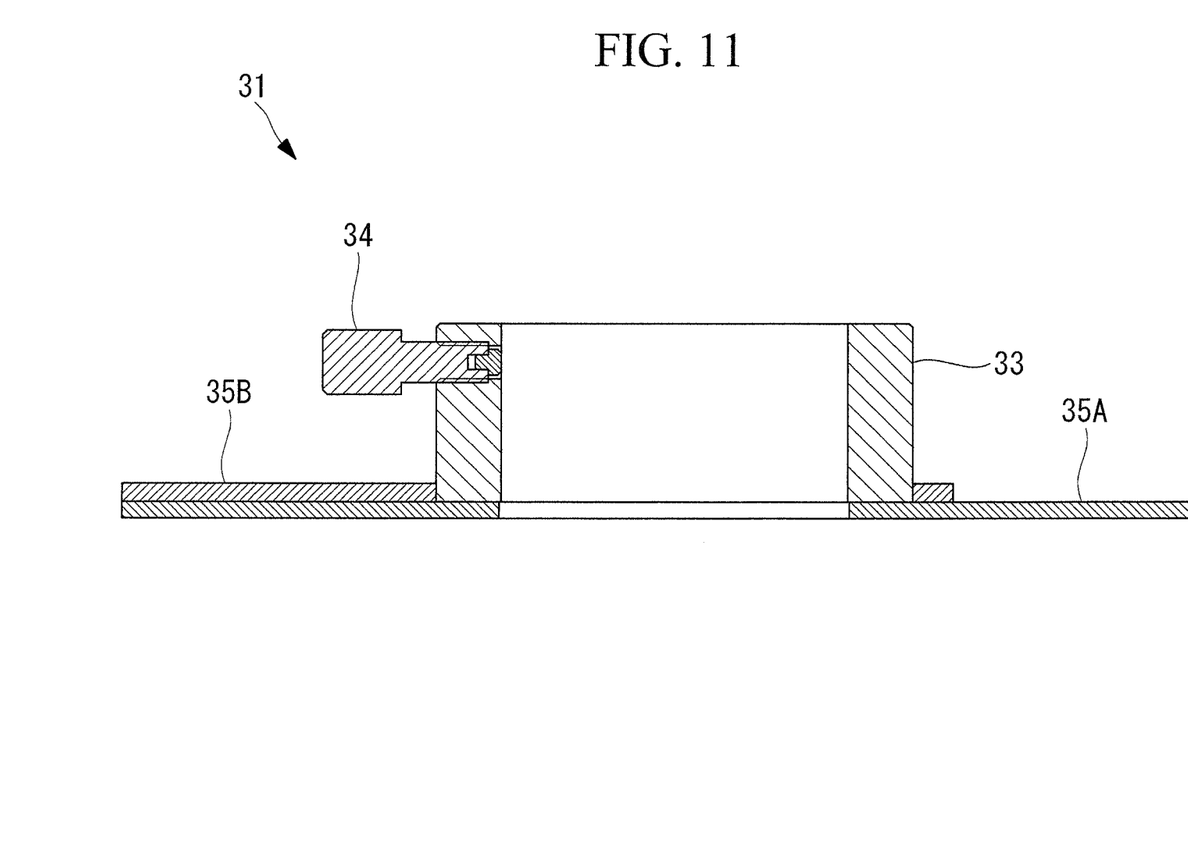
FIG. 11 is a vertical sectional view of the light blocking cover in FIG. 10A.

The non-movable piece 35A is positioned together with the attachment section 33 above the sample S placed on the stage 13. The movable piece 35B can be moved in the circumferential direction of the attachment section 33 relative to the non-movable piece 35A. For example, by positionally shifting the movable piece 35B in the circumferential direction of the attachment section 33 relative to the non-movable piece 35A, as shown in FIG. 10A, the upper side of the sample S placed on the stage 13 can be covered with the movable piece 35B and the non-movable piece 35A. Moreover, by overlapping the movable piece 35B with the non-movable piece 35A in the central-axis direction of the attachment section 33, as shown in FIG. 10B, an open space can be formed above the sample S placed on the stage 13.

Figure 12A:
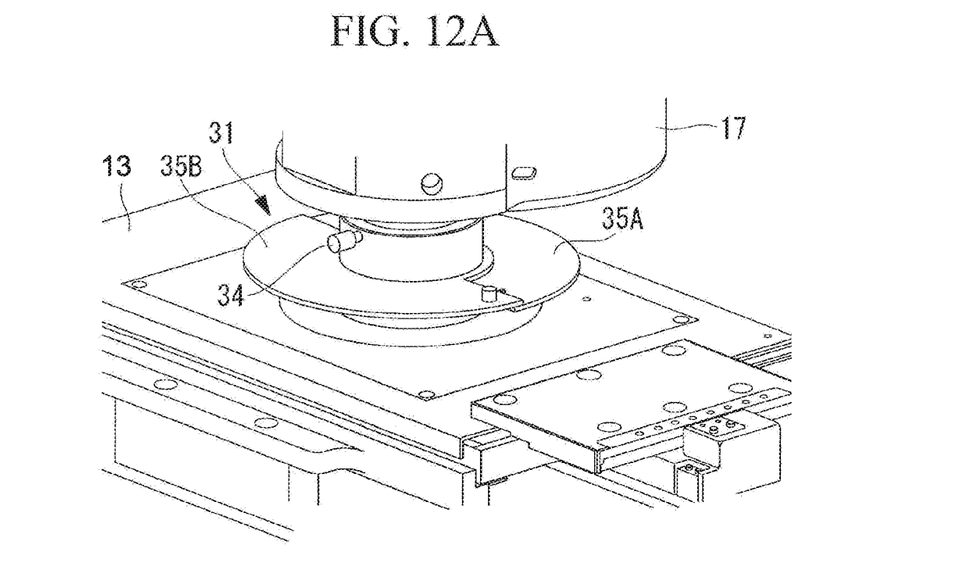
FIG. 12A is a perspective view illustrating a state where the non-movable piece and the movable piece of the light blocking cover attached to the microscope body are disposed around the entire circumferential direction.
Figure 12B:
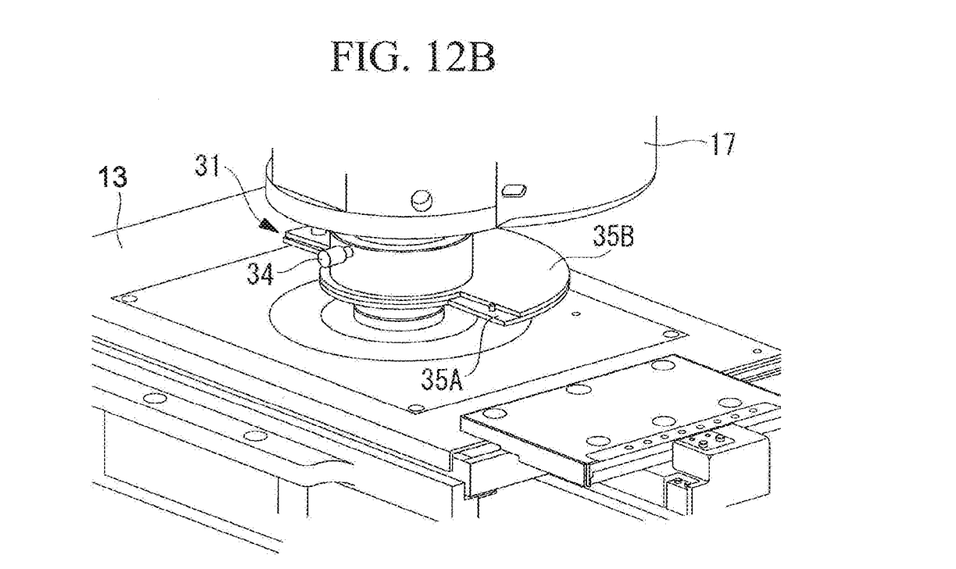
FIG. 12B is a perspective view illustrating a state where the non-movable piece and the movable piece of the light blocking cover attached to the microscope body are overlapped in the axial direction.

According to this modification, during observation, the upper side of the sample S is set in a closed state by the movable piece 35B, as shown in FIG. 12A, so that the entire circumferential region above the sample S is covered by the movable piece 35B and the non-movable piece 35A, whereby light entering the optical path of the observation light from above the sample S via the stage 13 can be blocked. When replacing the sample S, as shown in FIG. 12B, the movable piece 35B is moved in the circumferential direction so that an open space is formed above the sample S, thereby facilitating the replacement process of the sample S even in a laser scanning microscope 1 having a non-tiltable transmissive column 25.

Although the movable piece 35B is movable in the circumferential direction of the attachment section 33 in this modification, the moving direction of the movable piece 35B is not limited to the circumferential direction of the attachment section 33 so long as an open space can be formed above the sample S by moving the movable piece 35B relative to the non-movable piece 35A.

The following invention is derived from the above embodiment.

An aspect of the present invention provides a laser scanning microscope including a stage on which a sample is placed, an objective lens that is disposed below the stage and that focuses laser light from a light source onto the sample, a scanner that scans the laser light focused by the objective lens over the sample, a condenser lens disposed opposite the objective lens with the stage interposed therebetween, and a light blocking cover that is disposed in an optical path between the condenser lens and the stage and that blocks external light entering the objective lens or the condenser lens from above the sample via the stage.

According to this aspect, external light, such as light from a fluorescent lamp, entering the objective lens by passing through the stage from above the sample or entering the condenser lens by being reflected by the stage is blocked by the light blocking cover. Therefore, the laser scanning microscope does not have to be used in a darkroom or be covered with a dark box, thereby achieving improved ease of operation during observation and preventing external light from entering from above the sample.

In the above aspect, the light blocking cover may be attached to the condenser lens in an attachable and detachable manner, and an attachment position of the light blocking cover in the condenser lens may be changeable in an optical-axis direction of the condenser lens.

This configuration allows for improved ease of operation without needing to support the light blocking cover at the stage. Furthermore, when moving the condenser lens, the light blocking cover moves together therewith, thereby facilitating the replacement process of the sample. In this case, by adjusting the attachment position of the light blocking cover in the optical-axis direction of the condenser lens in accordance with the position of the condenser lens in the optical-axis direction, the distance from the stage to the light blocking cover in the optical-axis direction can be properly maintained, thereby maintaining the blocking efficiency of the light blocking cover against external light from above the sample.

In the above aspect, the light blocking cover may include a non-movable piece that is positioned above the sample placed on the stage and a movable piece that moves relative to the non-movable piece so as to form an open space above the sample.

With this configuration, when replacing the sample, an open space is formed above the sample by the movable piece of the light blocking cover, thereby facilitating the replacement process of the sample.

In the above aspect, the light blocking cover may have a flange section extending in a direction that intersects an optical axis of the condenser lens, and the flange section may have a width that satisfies the conditional expression below:

$$R \geq r_o + L_o \tan \theta_o$$

where R denotes half of the width of the flange section of the light blocking cover, $r_o$ denotes an aperture radius of the objective lens, $L_o$ denotes a distance between the objective lens and the light blocking cover in an optical-axis direction, and $\theta_o$ denotes an aperture angle of the objective lens.

In vertical-illumination observation, when external light passing through the stage from above the sample enters the objective lens, the light is detected by a photodetector. With the width of the flange section of the light blocking cover satisfying the above conditional expression, the light blocking cover can more reliably prevent the external light passing through the stage from above the sample from entering the objective lens during vertical-illumination observation.

In the above aspect, the light blocking cover may have a flange section extending in a direction that intersects an optical axis of the condenser lens, and the flange section may have a width that satisfies the conditional expression below:

$$R \geq r_c + 2L_c \tan \theta_c$$

where R denotes half of the width of the flange section of the light blocking cover, $r_c$ denotes an aperture radius of the condenser lens, $L_c$ denotes a distance between the stage and the light blocking cover in an optical-axis direction, and $\theta_c$ denotes an aperture angle of the condenser lens.

In transmission observation, when external light reflected by the stage from above the sample enters the condenser lens, the light is detected by the photodetector. With the width of the flange section of the light blocking cover satisfying the above conditional expression, the light blocking cover can more reliably prevent the external light reflected by the stage from above the sample from entering the condenser lens during transmission observation.

In the above aspect, the laser scanning microscope may further include a light-blocking tubular member that has light blocking properties and has a tubular shape. The light-blocking tubular member is disposed opposite the stage with the condenser lens interposed therebetween and covers an area surrounding an optical axis of the condenser lens.

With this configuration, external light detected by being reflected by the condenser lens from above the sample during transmission observation can be blocked by the light-blocking tubular member. Therefore, the external light from above the sample can be more reliably prevented from entering during transmission observation.

In the above aspect, the light-blocking tubular member may be expandable and contractible in an optical-axis direction.

With this configuration, the length of the light-blocking tubular member in the optical-axis direction can be adjusted in accordance with the position of the condenser lens in the optical-axis direction, thereby maintaining the blocking efficiency of the light-blocking tubular member against external light from above the sample.

The invention claimed is:

1. A laser scanning microscope comprising:
a stage configured to have a sample placed thereon;
an objective lens that is disposed below the stage and that is configured to focus laser light from a light source onto the sample;
a scanner that is configured to scan the laser light focused by the objective lens over the sample;
a condenser lens disposed opposite the objective lens with the stage interposed therebetween;
a transmission detector that detects observation light that is generated at a condenser lens side of the sample by radiating the laser light to the sample via the objective lens, the observation light being condensed by the condenser lens; and
a light blocking cover that is disposed in an optical path between the condenser lens and the stage and that blocks external light entering the condenser lens from above the sample via the stage, wherein the light blocking cover is attached to the condenser lens, and the light blocking cover has a light-transparent opening at a central portion thereof.

2. The laser scanning microscope according to claim 1, wherein the light blocking cover is attached to the condenser lens in an attachable and detachable manner, and
wherein an attachment position of the light blocking cover to the condenser lens is changeable along an optical-axis direction of the condenser lens.

3. The laser scanning microscope according to claim 1, wherein the light blocking cover includes a non-movable piece that is positioned above a sample placement position on the stage, and a movable piece that moves relative to the non-movable piece so as to form an open space above the sample.

4. The laser scanning microscope according to claim 1, wherein the light blocking cover comprises a flange section extending in a direction that intersects an optical axis of the condenser lens, and
wherein the flange section has a width that satisfies the conditional expression below:

$$R \geq r_o + L_o \tan \theta_o$$

where R denotes half of the width of the flange section of the light blocking cover, $r_o$ denotes an aperture radius of the objective lens, $L_o$ denotes a distance between the objective lens and the light blocking cover in an optical-axis direction, and $\theta_o$ denotes an aperture angle of the objective lens.

5. The laser scanning microscope according to claim 1, wherein the light blocking cover comprises a flange section extending in a direction that intersects an optical axis of the condenser lens, and
wherein the flange section has a width that satisfies the conditional expression below:

$$R \geq r_c + 2L_c \tan \theta_c$$

where R denotes half of the width of the flange section of the light blocking cover, $r_c$ denotes an aperture radius of the condenser lens, $L_c$ denotes a distance between the stage and the light blocking cover in an optical-axis direction, and $\theta_c$ denotes an aperture angle of the condenser lens.

6. The laser scanning microscope according to claim 1, further comprising:
a light-blocking tubular member that has light blocking properties and has a tubular shape, the light-blocking tubular member being disposed opposite the stage with the condenser lens interposed between the light-blocking tubular member and the stage, and the light-blocking tubular member covering an area surrounding an optical axis of the condenser lens; and
a transmissive column that extends in a vertical direction to support the condenser lens, the light-blocking tubular member, and the transmission detector,
wherein the light-blocking tubular member covers a circumference of the optical path along the optical axis of the condenser lens in a space above the condenser lens.

7. The laser scanning microscope according to claim 6, wherein the light-blocking tubular member is expandable and contractible along an optical-axis direction.

* * * * *